US008425663B2

(12) United States Patent
Thundyil et al.

(10) Patent No.: US 8,425,663 B2
(45) Date of Patent: Apr. 23, 2013

(54) METHOD FOR THE SELECTIVE EXTRACTION OF ACIDS, BASES AND POLAR SALTS

(76) Inventors: Matt Thundyil, The Woodlands, TX (US); Michael Spearman, The Woodlands, TX (US); Martin Miller, The Woodlands, TX (US); Doug Mittlesteadt, Saline, MI (US); Heath Burns, Conroe, TX (US); Carl Hahn, Sugar Land, TX (US)

( * ) Notice: Subject to any disclaimer, the term of this patent is extended or adjusted under 35 U.S.C. 154(b) by 237 days.

(21) Appl. No.: 11/980,322

(22) Filed: Oct. 30, 2007

(65) Prior Publication Data

US 2008/0127823 A1   Jun. 5, 2008

Related U.S. Application Data

(62) Division of application No. 10/995,843, filed on Nov. 22, 2004.

(51) Int. Cl.
    *B01D 47/02* (2006.01)
(52) U.S. Cl.
    USPC .................. 95/214; 95/237; 96/300; 96/361; 96/364
(58) Field of Classification Search .................. 95/214, 95/237–240, 226; 96/361, 355, 363–364, 96/300, 362, 337
See application file for complete search history.

(56) References Cited

U.S. PATENT DOCUMENTS

| | | | | |
|---|---|---|---|---|
| 4,129,500 A * | 12/1978 | Jeffreys et al. | ................. | 516/138 |
| 4,252,543 A * | 2/1981 | Giles | ........................... | 48/197 R |
| 4,290,881 A * | 9/1981 | Dielacher et al. | ......... | 208/310 R |
| 4,878,929 A * | 11/1989 | Tofsland et al. | ................. | 55/486 |
| 5,122,169 A * | 6/1992 | Schumacher et al. | .......... | 96/242 |
| 5,605,748 A * | 2/1997 | Kennedy et al. | ................ | 55/486 |
| 5,750,024 A * | 5/1998 | Spearman | ..................... | 210/315 |
| 5,876,589 A * | 3/1999 | Su et al. | ......................... | 205/695 |
| 6,849,105 B2 * | 2/2005 | Baudry et al. | ..................... | 95/94 |
| 6,899,322 B2 * | 5/2005 | Sadykhov | ..................... | 261/78.2 |
| 7,604,685 B2 * | 10/2009 | Thundyil et al. | ................ | 95/211 |
| 2007/0186771 A1 * | 8/2007 | Thundyil et al. | ................ | 95/214 |

* cited by examiner

*Primary Examiner* — Duane Smith
(74) *Attorney, Agent, or Firm* — Thomas A. O'Rourke; Bodner & O'Rourke, LLP (57) ABSTRACT

A process for the extraction of an unwanted material from a gas comprising the steps of introducing an extraction liquid into a fluid having an unwanted liquid therein to form a physical aerosol comprising a plurality of extraction liquid droplets and the fluid, allowing the plurality of extraction liquid droplets to interact with the unwanted liquid in the gas to cause the extraction liquid droplets to be "wetted out" and captured on a porous medium, where the liquid is further contacted by the gas and simultaneously formed into a plurality of coalesceable droplets, coalescing the coalesceable droplets into larger droplets containing the unwanted liquid, and separating the larger droplets containing the unwanted liquid from the fluid.

53 Claims, 5 Drawing Sheets

Fig. 3
Scanning Electron Micrograph of MicroForm™
media: $\beta_2$ - 5,000
500x magnification

FIG. 5 the removal of

METHOD FOR THE SELECTIVE EXTRACTION OF ACIDS, BASES AND POLAR SALTS

CROSS REFERENCE TO RELATED APPLICATIONS

Divisional of U.S. application Ser. No. 10/995,843 filed Nov. 22, 2004.

FIELD OF THE INVENTION

The present invention relates generally to the removal of undesired vaporized materials from a gas and more particularly to a process for the selective removal of acids from a gas or of heavier hydrocarbon removal from a gas stream.

STATEMENT REGARDING FEDERALLY SPONSORED RESEARCH OR DEVELOPMENT

None

REFERENCE TO A MICROFICHE APPENDIX

None

BACKGROUND OF THE INVENTION

Acids are used to catalyze reactions in a number of different syntheses in the refining, chemical, petrochemical, and pharmaceutical industries among others. Acids may also be formed from syntheses, as reaction byproducts. When the stream is a gas, it is often desired to eliminate the acid from the gas. Elimination of the acid from the gas is traditionally accomplished by means of base neutralization that typically involves a caustic scrubbing process. That is, a base in the form of a liquid is added to the gas to neutralize the acids.

Typically, an excess of the base neutralizer must be added to assure complete removal of acid. The neutralization of the acid by the base neutralizer results in salt byproducts being formed. Following the acid neutralization process, the excess base neutralizer and salt byproducts must be removed.

Since the base is a liquid and a separate phase from the fluid, the neutralization is generally accomplished in columns where the base is dispersed into the gas to facilitate the neutralization. The gas bubbles rise up the column, contacting the liquid base. The excess base and reaction byproducts are subsequently removed at the bottom of the column. The efficacy of this system is related to the mass transfer efficiency between the two phases. This is directly related to the specific contact area (area per unit volume) that is available for mass transfer. To increase this area, many columns will typically use either structured or unstructured packing. The limited specific contact area possible necessitates increasing the size of the packing. The gas stream, exiting the column will typically entrain with it, an aerosol of base neutralizer that may cause challenges downstream. Therefore, it is necessary to introduce a high-efficiency aerosol-removal separator downstream. Typically, then, the mass transfer between the liquid and gas, and the complete separation of the liquid from the gas occur in two separate devices.

A disadvantage of the above conventional two-stage acid neutralization process is associated with the capital costs for the hardware such as towers and reaction tanks.

Similarly, in the refining and other industries, gaseous hydrocarbon streams that contain a range of hydrocarbons are stripped of the heavier hydrocarbon components through absorption into absorption oil in an absorber column or an absorber stripped column.

The present invention provides a process for the removal of an unwanted component from a gas by introducing an extracting liquid to extract the unwanted component from the gas through an interaction between the extracting liquid and the unwanted component. In a preferred embodiment, the volume of extracting liquid can be generally the same as the volume of the component to be extracted. More specifically, this invention relates to the process of creating an aerosol of an extractive liquid, capturing this aerosol on a high specific area microstructure to effect the extraction of the unwanted component and separation of the liquid phase within this microstructure. The extraction occurs from the gas to a liquid phase that is either stably dispersed in the primary phase gas or a film on the porous medium. In the case of the removal of an acid from a gas, the process involves creating an aerosol or dispersion of a polar liquid phase that is stably dispersed in the gas stream and forms a film on the porous medium. In the case of removing heavier hydrocarbons, the process involves creating an aerosol or dispersion of an extractive liquid that oleophilically interacts with the heavy hydrocarbons in the gas to form a "rich" oil phase that is stably dispersed in the light hydrocarbon gas stream and forms a film on the porous medium.

This stable aerosol or dispersion, may be defined as a stable suspension of a discontinuous liquid phase within another continuous gas phase that is not separable by conventional gas/liquid separation technologies—such as filter-coalescers, residence time coalescers with mesh-pads or vane-packs, etc. For such stability, the discontinuous liquid phase consists of droplets in the 0.1-1-micron range, with the larger droplet end of the spectrum possibly extending up to 10-micron range. This stable aerosol dispersion is necessary to facilitate the first stage of the intimate mass-transfer between the primary and secondary phases. Following the dispersion, the second stage of the invention relates to then using a coalescer such as a porous medium to capture, coalesce, and separate the rich liquid in the form of droplets from the gas. The film of rich liquid on the high surface area porous medium provides a secondary stage for extraction. In order for the porous medium to capture the droplets it must be constituted with fibers that are of such dimensions and interfacial properties as to be able to be "wetted-out" by the liquid, thus enabling it to capture these droplets. This typically requires the fibers to be of the order of magnitude of the droplets; in other words, the porous medium must consist of fibers that are at least in the 0.5-2-micron range. This invention then provides for the contact and separation of the extracting medium in a single device.

DESCRIPTION OF THE PRIOR ART

The concept of utilizing fibers for providing a high surface area contactor for extraction in the liquid phase has been described by Clonts in U.S. Pat. No. 3,992,156 "Mass Transfer Apparatus" and U.S. Pat. No. 3,977,829 "Liquid-Liquid mass transfer apparatus." The concept of using droplets to extract a vapor constituent from a gas, followed by the use of a mesh-pad to recover the rich liquid has been described by Bloomer in U.S. Pat. No. 4,397,662 "Apparatus for removing solvents from air". Schumacher and others extended this concept to using a mesh pad for absorption in U.S. Pat. No. 5,122,169 "Chemical recovery scrubbing system". Fisher, in U.S. Pat. No. 6,136,282 for "Method for removal of hydrogen sulfide from gaseous streams" teaches a method for the use of a high surface area contactor, onto which droplets are sprayed, with the subsequent removal of the scavenging agent.

In all of the known examples in the literature, the mechanism of extraction and complete separation of the extracted phase occurs in two different stages.

For example, Clonts teaches the use of fibers for extraction of one component from a liquid into another liquid. He teaches the use of fibers for the purposes of forming a film of liquid enabling contact with the bulk fluid stream to provide for mass transfer. However, the mechanism of separation of the extracting fluid is that of a "separator approximate the downstream end of the fibers and then separately removing the two liquids from the separator". Clonts does not teach the use of fibers for the extraction of a component into a liquid from gas, and the teaching requires a separate separation stage.

Bloomer teaches the use of an apparatus where the absorption liquid is sprayed over a plurality of mesh-pads which are arranged sequentially in the direction of gas flow. The necessity of a multiplicity of mesh-pads is related to the inability of the mesh-pads to effectively accomplish the necessary mass transfer in a single stage, and inability to effectively remove all the absorption liquid in a single stage. This invention does not teach the use of a method that effects contact and separation in a single stage.

Schumacher and others teach a scrubbing system where the liquid is sprayed through the gas stream for absorption on a demister screen. Schumacher explicitly provides for final removal of droplets with "candle filters of hydrophobic fibrous material". This invention does not teach the use of a method that effects contact and separation in a single stage.

Fisher teaches the use of the wetted surface area of contactor surfaces including closely packed parallel plates, knitted meshes, parallel banks of small diameter tubes, types of structured packing similar to those used in mist eliminators etc. However, the method of Fisher requires that the "byproducts thus formed are removed from the natural gas streams by conventional means." This invention does not teach the use of a method that effects contact and separation in a single stage.

SUMMARY OF THE INVENTION

The present invention provides a process, preferably in a single stage, for the extraction of an unwanted component, such as an acid, from a gas through the introduction of a relatively small volume of a liquid, such as water. The liquid would be introduced into the gas in the form of a stable aerosolized dispersion of droplets in the 0.1 to 10 micron range, followed by the subsequent wetting out, capture, and removal of the liquid on a microstructured separator. Another example would be the extraction of heavy hydrocarbons from a light hydrocarbon stream, through the introduction of a volume of hydrocarbon oil such as kerosene into the gas stream. The introduction of such an absorbent or stripping fluid should be in the form of a spray. The droplet size of the spray should be selected to keep the droplets entrained in the gas stream and not settle out by gravitational forces. This droplet size would typically be in the range of 0-300 micron depending on gas velocity, preferably less than 20 micron, and even more preferably in the 0.1-5-micron range. An example of a stable, aerosol dispersion is one that does not readily gravitationally settle. By forming such fine droplets, one can form a stable aerosol with the droplets dispersed throughout the fluid. The size of the droplets is such that they cannot be separated from the fluid by conventional means. Because the plurality of such fine droplets and the component to be removed in the fluid attract each other through a physical or chemical interaction they form a plurality of droplets containing one or more components to be removed, which are smaller than the droplets which may be separated by conventional gas/liquid coalescers including mesh pads, vane-packs, residence time separators, and filter-coalescers. This stable aerosol, or dispersion may be defined as a stable suspension of a discontinuous liquid phase within a continuous gas phase, wherein the discontinuous liquid phase consists of droplets in the 0.1-1 micron range, with the larger droplet end of the spectrum possibly extending up to the 10-micron range, and is not separable by conventional gas/liquid separation technologies—such as filter-coalescers, residence time coalescers with mesh-pads or vane-packs etc. This stable aerosol or dispersion is necessary to facilitate the specific surface area necessary to facilitate the intimate mass-transfer between the primary and secondary phases, in the microstructured extractor described below.

The preferred embodiment is to deliver the spray to the inlet of each individual contactor element thereby controlling even gas and liquid flow distribution to the packing. Another possibility is to introduce the extraction liquid into the main gas stream at a single point in the form of droplets that are in the preferred size range so that they remained entrained in the gas stream. This would typically be droplets less than 20-micron in size, and preferably, less than 5-micron in size.

The fluid containing the droplets is then directed to a "micro" structured packing. Typical structured packing, or random packing that is used preferably has a maximum specific surface area of 1000 m2/m3. The "micro" structured packing has a specific surface area >2,000 m2/m3, typically in the 5,000-10,000 m2/m3 range. This high surface area provides for stage efficiencies of >95% and even >99%. This level of stage efficiency allows for co-current extraction processes (rather than multi-stage extraction contactors). The details of an example of a micro structured packing is shown in Table 1.

TABLE 1

| | | | |
|---|---|---|---|
| Fiber Diameter | 0.5 | micron | 0 m |
| Fiber Length | 1 | cm | 0.01 m |
| Packing Density | 5% | | |
| Single Fiber A/V | 4000000 | m2/m3 | |
| Fiber Matrix A/V | 200000 | m2/m3 | |
| Element Dia | 5.5 | in | 0.14 m |
| Element Length | 36 | in | 0.91 m |
| Element Volume | 0.01 | m3 | |
| Media Area | 14 | ft2 | 1.3 m2 |
| Media Thickness | 0.02 | in | 0 m |
| Media Volume | 0 | m3 | |
| Surface Area | 132.15 | m2 | |
| MicroStructure Area | 9428.29 | m2/m3 | 3000-10000 m2/m3 |

The preferred microstructured extractor of the present invention is a porous medium that has the capability to capture and grow these droplets. In order for the porous medium to capture the droplets it should be constituted with fibers that are of such dimensions as to be "wetted out" by the droplets and able to capture these droplets. This typically requires the fibers to be of the order of magnitude of the droplets, in other words, the porous medium must have fibers that are preferably at least in the 0.5-2 micron range. Materials may be selected so as to have affinity for the extraction fluid, that is, the fibers may be selected such that the interfacial surface tension between the fibers and the extraction liquid are low enough to allow the extraction liquid to "wet out" on the fibers. The droplets, which are coalesced on the fibers of the coalescing device to form larger polar droplets, can be gravitationally separated from the fluid. Once gravitationally separated, the larger droplets may then be removed from the fluid by, for example, a gas-liquid separation device. The liquid may be water, a base or a buffer solution in the case of a separation of an acid from a gas stream, or may be an hydrocarbon oil such as kerosene in the case of a separation of a heavy hydrocarbon vapor from a light hydrocarbon or hydrogen gas. The microstructured packing may be in any form. However, a cylinder or hollow conical configuration is preferred to allow co-current flow of the extraction liquid through the packing while allowing for ease of separation of the extraction liquid on the downstream side of the packing. The conical or cylindrical units would have one open end-cap and one closed end-cap. The open end-cap is in communication with the gas to be treated. Multiple units may be used inside of a vessel, etc.

The extraction liquid is dispersed in the gas stream within the contactor element and flow through the element with the gas. The microstructured extractor, then, acts to provide the necessary mass-transfer area, while simultaneously removing the aerosolized extracting liquid from the gas phase. The liquid droplets are captured by the fibers in the micro-structured packing, wet out the surface of the fibers where they form a dynamic ultra surface area for gas/liquid contact. This allows for high mass transfer of the undesirable gas components from the gas phase to the extraction liquid. As additional lean extraction liquid is continuously delivered to the upstream side of the packing, the liquid within the packing flows through the packing and emerges on the downstream side. The rich extracting liquid is gravitationally separated and drained away from the gas stream on the outside of the contactor element.

DESCRIPTION OF THE PREFERRED EMBODIMENT

In general the present invention provides a process for the extraction of an unwanted component from a gas. In the preferred method it provides a process for the extraction of an acid from a gas through the introduction of a relatively small volume of a liquid such as water into the fluid as a stable aerosol or dispersion consisting of a plurality of water-acid droplets and then using a microstructured extractor such as a porous medium to be wetted out and to capture the droplets, thereby increasing the specific surface area for contact, and coalesce the droplets into separable size for extraction of the acid in the form of the water-acid droplets. The gas from which the acid is being extracted is preferably but not limited to gases that are not very soluble in water including hydrocarbons, air, or hydrogen. The acid(s) that can be extracted from the gas by the present process include but are not limited to hydrochloric acid. Another preferred application involves the extraction of heavy hydrocarbon vapors from a light hydrocarbon, hydrogen or air stream through an aerosolized extracting fluid such as kerosene. Another preferred application involves the extraction of oxygen from a gas stream using an oxygen scavenging liquid.

Figure 1:
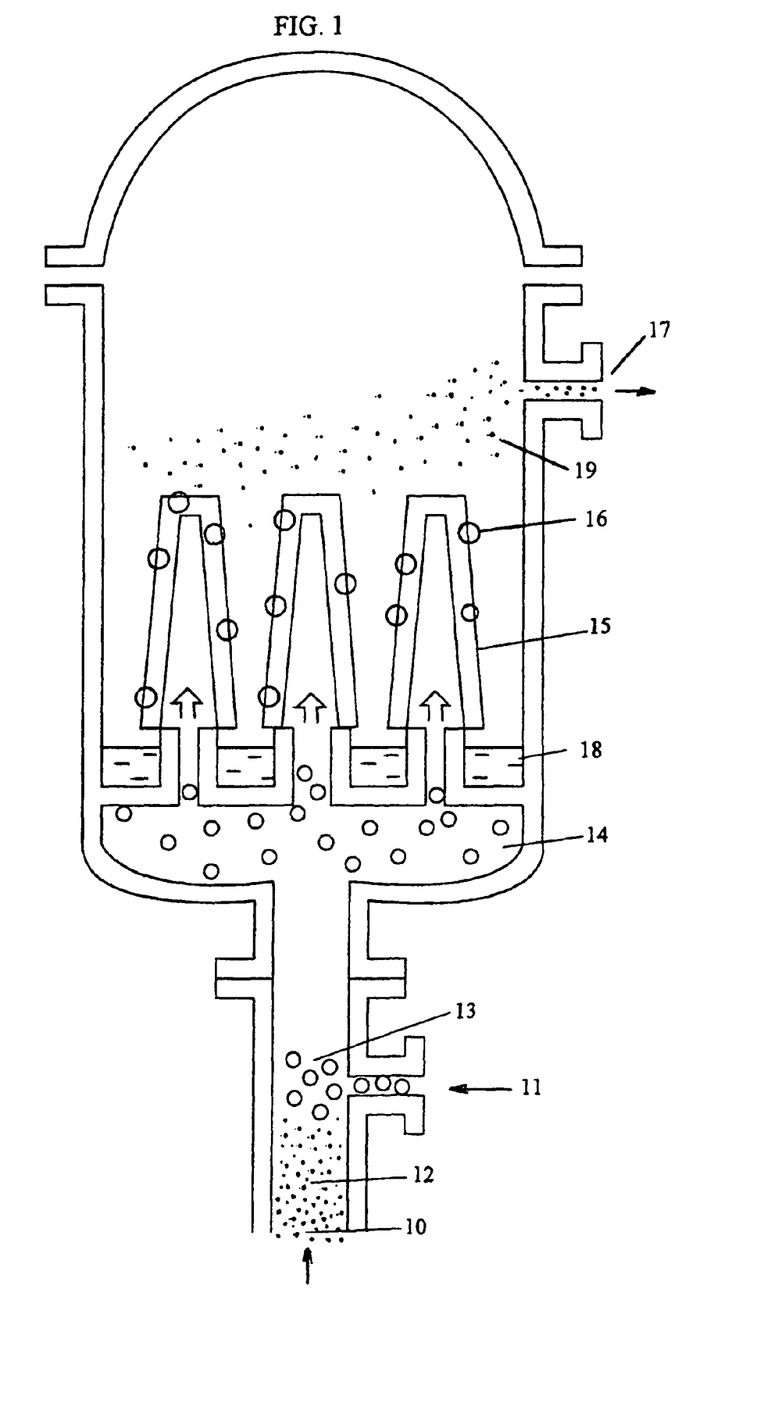
FIG. 1 shows a simplified sectional view of an apparatus for introducing a polar liquid into a gas containing a component to be removed.

FIG. 1 shows a simplified sectional view of an apparatus for introducing an extracting liquid into a gas 10 containing a vaporized component to be removed 12. As shown in FIG. 1, the vaporized component to be removed 12 is uniformly dispersed throughout the fluid 10. In the process of extracting the component 12 from gas 10, a substantially nonvolatilized volume of an extraction liquid such as water 11 is introduced into the fluid 10 containing the component 12. Since the component 12 in the gas 10 has a much greater affinity for the extraction liquid 11 than for the gas 10, the component 12 will move away from gas 10 and move towards the extraction liquid 11.

To further speed up the movement of the component 12 towards the water, the extraction liquid 11 introduced into the gas 10 is formed into a plurality of aerosolized, and dispersed droplets 13 which are then dispersed throughout gas 10 thereby creating a stable physical emulsion. The extraction fluid 11 is formed into the stable aerosol dispersion of droplets 13 by various means such as but not limited to injection nozzles, mixing, pressurizing, or agitating the gas 10. The stable aerosol or dispersion of droplets 13 formed are sufficiently small so that the droplets 13 cannot be effectively separated by conventional residence-time devices such as mesh-pads, vane-packs, conventional "filter-separators," conventional extraction columns with structured or random packing. Although the droplets may be larger in size, the present method preferably utilizes water droplets having diameters ranging from 5-microns to sub-micron levels. The dispersal of the aerosolized droplets 13 through out the gas 10 speeds up the movement of the component 12 to the extracting fluid 11 since the distance that the component 12 has to travel to reach and interact with the water (i.e., stable aerosol of droplets 13) is greatly reduced. Once the acid reaches the stable aerosol droplets 13, due to the physical and chemical driving forces, the stable aerosol droplets 13 and the component 12 in the gas 10 attract to each other through a chemical or physical interaction to form a plurality of rich droplets 14 that are also a stable aerosol droplets 14.

The gas 10 containing the stable aerosol droplets 14 is then directed to a microstructured extractor such as a porous medium 15. The porous medium 15 has an extended surface area for fluid to flow therethrough. Porous medium 15 can have various shapes and sizes, such as for example a cylinder or frustum configuration. The porous medium 15 may also comprise a single sheet that is pleated to provide an extended surface area for separation or multiple sheets of porous medium sandwiched together to form an asymmetric-shaped medium having pore size distributions and interfacial energy properties varying in the direction of flow.

One of the characteristics of the porous medium 15 used in the present invention is that the porous medium 15 has an appropriate chemical compatibility with the gas 10 and the extraction liquid such as water, while having the capability to capture and coalesce the plurality of rich droplets 14 into a plurality of larger rich droplets 16 (shown in FIG. 1). As the droplets are being captured and grown, the film on the fibers act to greatly increase the specific surface area for mass transfer between the gas and liquid. The fibers are such that they then release the plurality of larger rich droplets when they are grown to a size that can be gravitationally separated from the gas into holding area 18, with the gas 19 exiting outlet 17.

Porous medium 15 can be configured horizontally such that the plurality of larger rich droplets 16 and the gas 19 exits the porous medium in a direction that is perpendicular to the direction in which the extracting fluid 11 and gas 10 was initially introduced into the medium 15. Conversely, the porous medium 15 can also be configured vertically such that the plurality of larger rich droplets 16 and the gas 19 exits the porous medium in a direction that is parallel to the direction in which the gas 10 was initially introduced into the porous medium 15.

Figure 2:
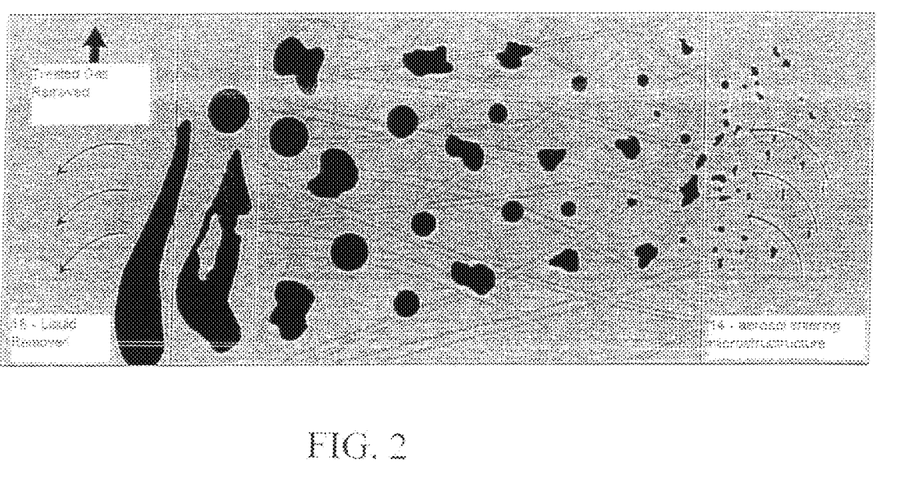
FIG. 2 shows a close-up view of the porous medium illustrating the mechanism of microstructured extraction of FIG. 1.
Figure 3:
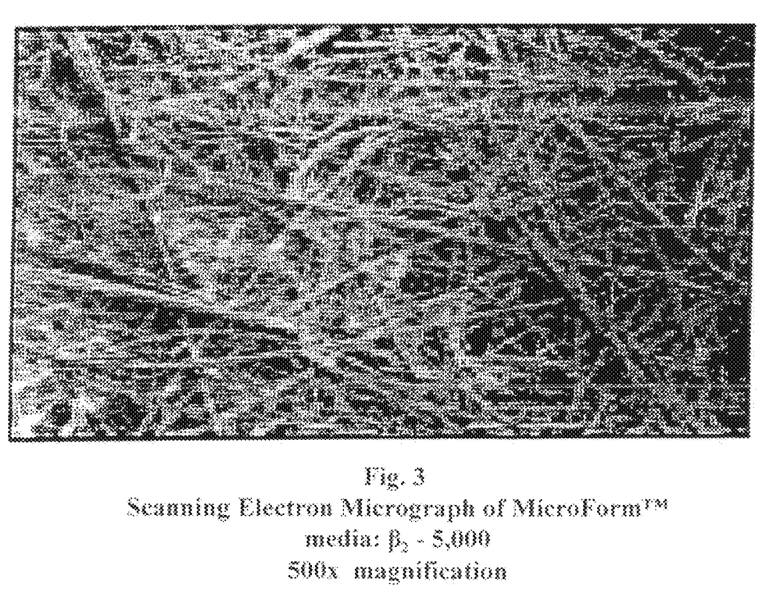
FIG. 3 shows a close-up view of the porous medium of FIG. 1.
Figure 4:
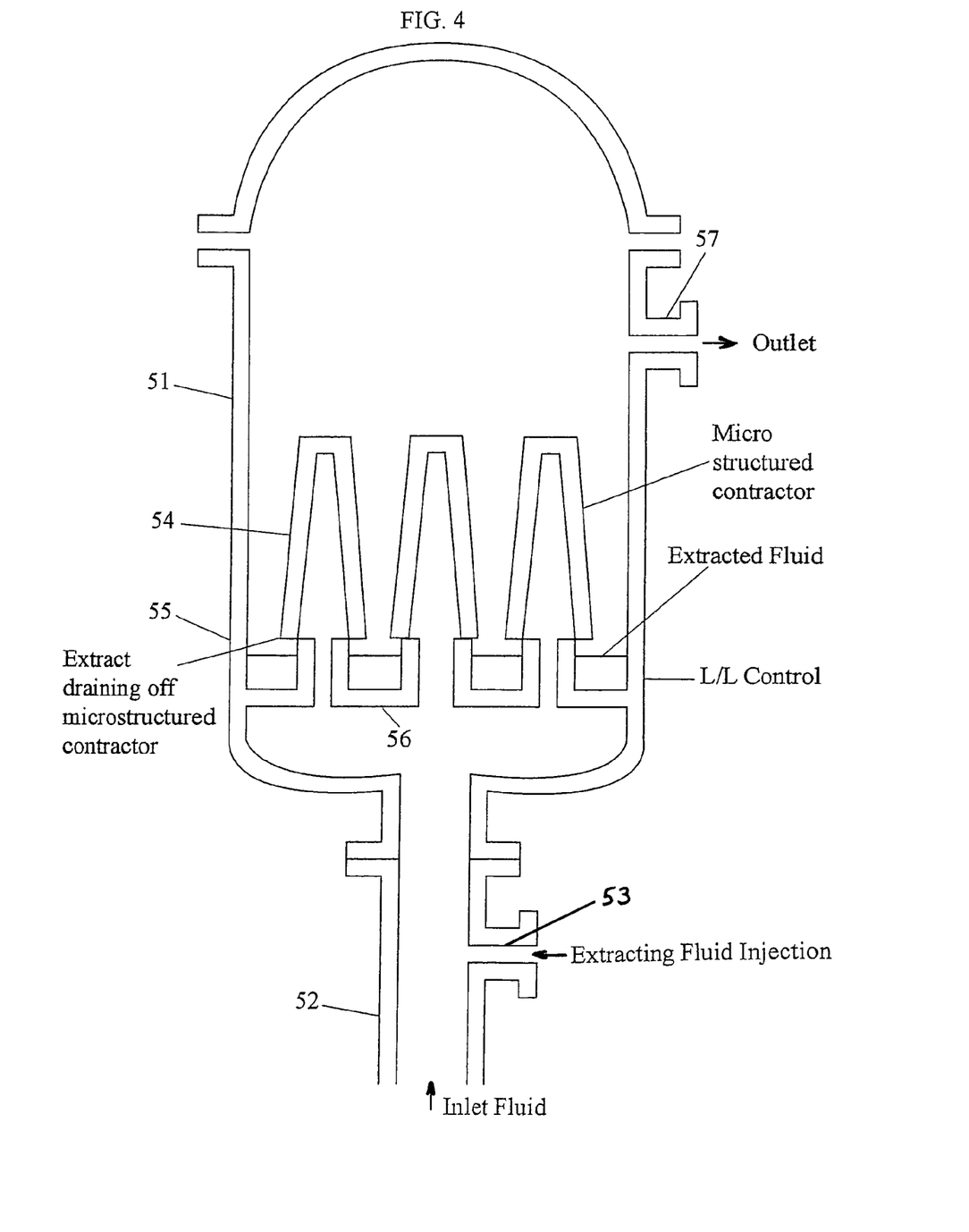
FIG. 4 is a schematic of a process whereby heavy hydrocarbons are being removed from a gas stream with an extracting oil, and the extracting oil being subsequently regenerated.
Figure 5:
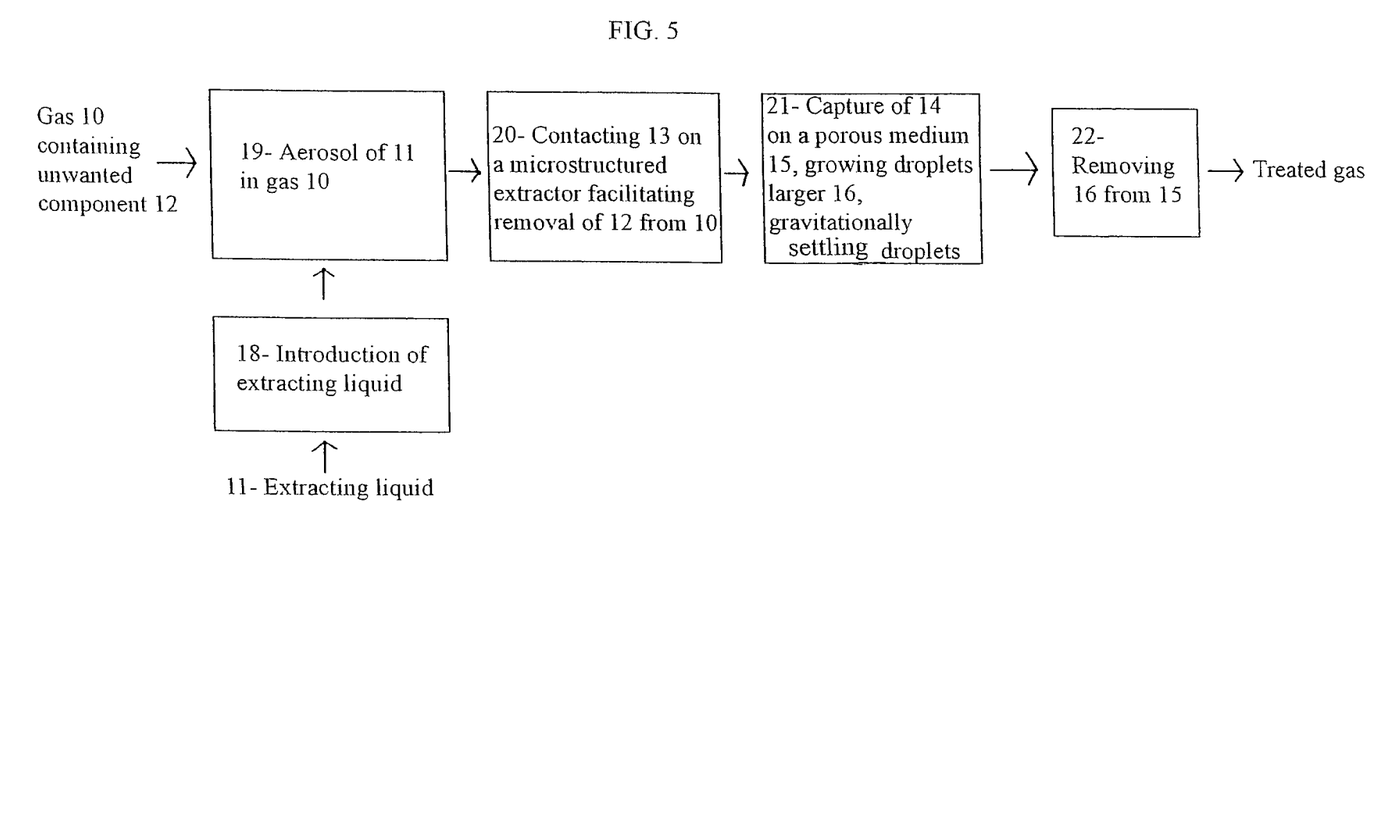
FIG. 5 is a schematic of a process whereby the acid extraction system is utilized.

As shown in FIG. 1 and more clearly shown in FIG. 2, once the stable aerosol of rich droplets 14 reach the porous medium 15, the stable aerosol of rich droplets 14 are captured in the porous medium 15, and coalesce in the porous medium 15 to form the plurality of larger rich droplets 16. One of the characteristics of the larger rich droplets 16 is that the larger rich droplets 16 have been grown to a size that can be gravitationally separated from the fluid.

Once the larger rich droplets 16 are formed to a separable size on the porous medium 15, the larger rich droplets 16 separate from the porous medium 15 and gravitationally settle in a phase separate from the fluid (not shown). After the larger rich droplets 16 have settled (not shown), the larger rich droplets 16 can then be removed from the gas 10 by various conventional means such as through a gas-liquid separation device.

Note that in gas-liquid separations, the difficulty in separating the different liquids increases as droplets of the liquid grow smaller. Conventional gas-liquid separation devices usually require large droplets to effect a separation, typically larger than 1-5-micron.

FIG. 2 is a close-up view of the porous medium 15 of FIG. 1 showing the manner in which the porous medium 15 coalesces the stable aerosol of rich droplets 14 into larger sized rich droplets 16 of sufficient size to gravitationally settle. The film formed on the fibers as the droplets are captured serves to enhance the mass-transfer efficiency.

The porous medium 15 used in the present invention can be made from both an inorganic material and/or an organic material. Examples of suitable inorganic materials include but are not limited to glass of various types, inorganic polymers and ceramic. Examples of suitable organic materials include but are not limited to polyolefins, polyphenylene sulfides, polyimides, polycarbonates, poly aramids, polyesters, polyamides, fluorinated polymers, Teflon, polyorganosilanes, polyacrylates, polysulfones, cellulose acetates, cellulosic materials (of natural or synthetic origin), and cotton. These materials may be utilized with or without binders that are designed to maintain structural integrity as well as modify interfacial properties.

Shown in FIG. 2, as the fluid 10 passes through the porous medium 15, the stable aerosol of rich droplets 14 are captured. As more stable aerosol of rich droplets 14 are captured, the captured rich droplets 14 coalesce to form the larger rich droplets 16. Once the larger rich droplets 16 have grown to a gravitationally separable size, they are pulled away from the porous medium 15 by the gas 10 that is moving through the porous medium 15.

In connection with the present process, although not required, it is preferable to filter the incoming fluid 10 to prevent the plugging and destruction of the porous medium 15 by particulate matter entrained in the fluid. Plugging of the porous medium 15 by particulates causes the undesirable effect of an increase in the pressure drop across the system. It is preferred that the limiting pressure drop across the porous medium to be less than 20 psi, preferably under 10 psi.

As noted above FIG. 4 is a schematic of a process whereby heavy hydrocarbons are being removed from a gas stream with an extracting fluid such as an oil, and the extracting fluid being subsequently regenerated. There is a vessel 51 that may have at its base an inlet 52 for receiving an inlet fluid such as a gas stream. The gas stream is preferably in the form of a vapor Downstream from the inlet but before the vessel there is a second inlet 53 for injecting an extracting fluid such as an oil. The extracting fluid is preferably in an aerosolized form. The stream enters into the vessel 51 whereupon it is directed to a microstructured extractor such as a porous medium 54. Once the stable aerosol of rich droplets reach the porous medium 54, the stable aerosol of rich droplets are captured in the porous medium 54, and coalesce in the porous medium 54 to form the plurality of larger rich droplets. See FIG. 2. The larger rich droplets can be gravitationally separated from the fluid. Gravitation causes the larger droplets to flow to the base 55 of the microstructured extractor where the droplets can be collected by any suitable means such as but not limited to a plurality of receptacles 56. The extracted droplets can drained from the receptacles. The remaining fluid may be removed from the vessel through outlet 57.

FIG. 5 is a block diagram view outline a process of acid extraction. More specifically, the process of acid removal as shown in FIG. 5 comprises the steps of the: (18) introducing a small volume of water or other neutralizing fluid 11 into the gas 10 containing an acid; (19) forming a plurality of water droplets in the gas 10 to create a stable physical emulsion with the water droplets 13 having a size that is sufficiently small so that the droplets will not gravitationally settle, the plurality of water droplets 13 attractable to the acid through a hydrophilic interaction to form a plurality of water-acid droplets 14; (20) directing the fluid containing the plurality of water-acid droplets 14 to a microstructured extractor comprising a porous medium 15 in which the porous medium 15 comprises an extended surface area design in an frustum or conical configuration; (21) capturing the plurality of water-acid droplets 14 in the porous medium 15; contacting the gas with the film of liquid on the porous medium 15; growing the liquid into a plurality of larger water-acid droplets 16, allowing the plurality of larger water-acid droplets 16 to gravitationally separate from the fluid; (22) and (23) separating the larger water-acid droplets 16 from the fluid to thereby remove the acid 12 from the fluid 10.

Thus the present process comprises a process for the extraction of an unwanted liquid from a gas by introducing an extraction liquid into a fluid having an unwanted liquid therein to form a physical aerosol comprised of a plurality of extraction liquid droplets and the fluid. A plurality of extraction liquid droplets interact hydrophilically, or oleophilically with the unwanted liquid in the fluid to cause the extraction liquid droplets to form into a plurality of droplets containing the extracted phase. Next, the mass transfer efficiency is enhanced by directing these dispersed droplets into a microdispersed extractor, where the droplets are captured by fibers on which the droplets form a film. The passage of gas through the fiber increases the surface area for mass transfer and enables the droplets to be grown and form larger droplets containing the unwanted liquid. At this point the larger droplets containing the unwanted liquid can be separated from the gas.

While the process has been described using water as an extract liquid, other liquids could be used that exhibit a polar attraction for an acid. It may be desired to use a buffer solution instead of the water. Similarly, the process can be implemented using a hydrocarbon oil to extract heavy hydrocarbon vapors from a gas stream. Similarly, the process can be implemented to extract oxygen from a gas stream.

Also, note that the process may involve the use of a heat exchanger to cool the gas down, thereby condensing the acid or hydrocarbon into an aerosol. The process may also involve the use of an extracting solvent to simultaneously cool the gas by the vaporization of the extracting liquid, and the extraction of the undesirable component into the remaining extracting liquid phase.

We claim:

1. A process for the extraction of a heavy hydrocarbon vapor from a gas comprising the steps of: introducing a volume of a crude-oil-based extraction fluid into said gas stream containing said heavy hydrocarbon vapor, said extraction fluid introduced into said gas stream by spraying said gas stream with an aerosol spray of said extraction fluid, to thereby form a stable aerosol comprising a plurality of droplets containing small extraction fluid droplets under 1 micron in diameter and being dispersed through said gas stream, said plurality of droplets being continuously attractable to said hydrocarbon vapor in said gas through an oleophilic interaction to form a plurality of aerosolized oil droplets in said gas stream; said plurality of aerosolized oil droplets forming a discontinuous liquid phase within a continuous gas phase, said discontinuous liquid phase having small aerosolized oil droplets in the 0.1 to 1 micron range; directing said gas stream containing said plurality of aerosolized oil droplets through a coalescer comprising a porous medium; capturing said plurality of aerosolized oil droplets by movement into said porous medium with fibers of dimensions similar to that of the plurality of aerosolized oil droplets created, at least one of the dimensions of said fibers in said porous media being in the 0.5 to 2 micron range, said porous medium having a specific surface area greater than 3,000 m2/m3, said porous medium being constructed without binders for maintaining structural integrity, and said fibers of said porous medium being wet out by said captured droplets to allow said captured aerosolized oil droplets to continue to interact with said small aerosolized oil drops in the fluid to further extract said small aerosolized oil drops onto said fibers, thereby growing said captured aerosolized oil droplets into a plurality of larger rich oil droplets containing said small aerosolized oil drops, and gravitationally separating said larger rich oil droplets from said gas by the time said gas reaches the outside of said porous medium, said extraction and removal of said hydrocarbon vapor being accomplished in a single stage.

2. The process of claim 1 wherein said crude oil based extraction fluid comprises a hydrocarbon oil.

3. The process of claim 1 wherein said porous medium is constructed into a frustum, and wherein said aerosolized stream flows from the inside to the outside.

4. The process of claim 1 wherein the volume of said crude oil based extracting fluid is substantially the same as the volume of said hydrocarbon vapor to be extracted and removed and wherein said crude oil based extracting fluid is kerosene.

5. The process of claim 1 including the step of orientating said porous medium vertically such that said larger rich oil droplets and said gas exits said porous medium in a direction that is substantially parallel to a direction in which said volume of extraction fluid was initially introduced into the fluid.

6. The process of claim 1 wherein said porous medium is a micro-structured separator constructed into a cylinder.

7. The process of claim 6 wherein said cylinder further comprises a plurality of pleated sheets, said pleated sheets being sandwiched together.

8. The process of claim 1 wherein said porous medium is constructed of materials having an affinity for said crude-oil-based extraction fluid.

9. The process of claim 8 wherein said fibers of said porous medium exhibit low interfacial surface tension with said extraction fluid, said low interfacial surface tension permitting said crude-oil-based extraction fluid to be wetted-out on said fibers.

10. The process of claim 9 wherein said wetted-out extraction fluid forms a film on said fibers, said film thereby enhancing mass-transfer efficiency.

11. The process of claim 10 wherein said porous medium is constructed of inorganic materials including one or more of glass, inorganic polymers, and ceramic.

12. The process of claim 10 wherein said porous medium is constructed of organic materials including one or more of polyolefins, polyphenylene sulfides, polyimides, polycarbonates, poly aramids, polyesters, polyamides, fluorinated polymers, Teflon, polyorganosilanes, polyacrylates, polysulfones, cellulose acetates, natural cellulosic materials, synthetic cellulosic materials, cotton, and blends thereof.

13. The process of claim 1 wherein said plurality of extraction fluid droplets are less than 300 microns in size.

14. The process of claim 13 wherein said plurality of extraction fluid droplets are of a size that is greater than 0.1 microns and less than 5 microns.

15. A process for the extraction of a heavy hydrocarbon vapor from a gas comprising the steps of: introducing a volume of a crude-oil-based extraction fluid into said gas stream containing said heavy hydrocarbon vapor, said extraction fluid introduced into said gas stream by spraying said gas stream with an aerosol spray of said extraction fluid, to thereby form a stable aerosol comprising a plurality of droplets containing small extraction fluid droplets under 1 micron in diameter and being dispersed through said gas stream, said plurality of droplets being continuously attractable to said hydrocarbon vapor in said gas through an oleophilic interaction to form a plurality of aerosolized oil droplets in said gas stream; said plurality of aerosolized oil droplets forming a discontinuous liquid phase within a continuous gas phase, said discontinuous liquid phase having small aerosolized oil droplets in the 0.1 to 1 micron range; directing said gas stream containing said plurality of aerosolized oil droplets through a porous medium; capturing said plurality of aerosolized oil droplets by wetting out of said plurality of aerosolized oil droplets upon fibers of said porous medium, said fibers being of dimensions similar to that of the plurality of aerosolized oil droplets created, at least one of the dimensions of said fibers in said porous medium being in the 0.5 to 2 micron range, said porous medium having a specific surface area greater than 1,000 m2/m3, said porous medium being constructed without binders for maintaining structural integrity, said wet out fibers of said porous medium allowing said captured aerosolized oil droplets to continue to interact with said small aerosolized oil drops in the fluid to further extract said small aerosolized oil drops onto said fibers, thereby growing said captured aerosolized oil droplets into a plurality of larger rich oil droplets containing said small aerosolized oil drops, and gravitationally separating said larger rich oil droplets from said gas by the time said gas reaches the outside of said porous medium, said extraction and removal of said hydrocarbon vapor being accomplished in a single stage.

16. The process of claim 15 wherein said porous medium is constructed into a frustum, and wherein said aerosolized stream flows from the inside to the outside.

17. The process of claim 15 wherein said porous medium is a micro-structured separator constructed into a cylinder, and wherein said cylinder further comprises a plurality of pleated sheets, being sandwiched together.

18. The process of claim 15 wherein said porous medium is constructed of materials having an affinity for said crude-oil-based extraction fluid.

19. The process of claim 18 wherein said fibers of said porous medium exhibits low interfacial surface tension with said extraction fluid, said low interfacial surface tension permitting said crude-oil-based extraction fluid to be wetted-out on said fibers to form a film.

20. The process of claim 1 wherein said plurality of extraction fluid droplets are formed by an injection nozzle.

21. The process of claim 15 wherein said plurality of extraction fluid droplets are formed by an injection nozzle.

22. The process according to claim 1 wherein said extraction fluid is introduced into said gas stream at a single point.

23. A process for the extraction of a heavy hydrocarbon vapor from a gas comprising the steps of: introducing a volume of said gas stream containing said heavy hydrocarbon vapor into a first inlet, said gas stream flowing from said first inlet past a second inlet, wherein said second inlet receives a volume of a crude-oil-based extraction fluid, said extraction fluid introduced into said second inlet in the form of an aerosol spray, said aerosol spray of extraction fluid comprised of a plurality of droplets having small droplets under 1 micron in diameter, said gas stream contacting said plurality of droplets of said aerosol spray at said second inlet wherein said plurality of droplets are dispersed through said gas stream to form a stable aerosol dispersion in said gas stream, said plurality of droplets being continuously attractable to said hydrocarbon vapor in said gas through an oleophilic interaction to form a plurality of aerosolized oil droplets in said gas stream; said plurality of aerosolized oil droplets forming a discontinuous liquid phase within a continuous gas phase, said discontinuous liquid phase having small aerosolized oil droplets in the 0.1 to 1 micron range; directing said gas stream containing said plurality of aerosolized oil droplets into a vessel that contains a porous medium, said porous medium having one or more sidewalls and an open end and a closed end, said gas stream passing into said porous medium through said open end; capturing said plurality of aerosolized oil droplets by movement into said porous medium with fibers of dimensions similar to that of the plurality of aerosolized oil droplets created, said porous medium consisting of fibers that have dimensions in the 0.5 to 2 micron range, said porous medium having a specific surface area greater than 3,000 m2/m3, said porous medium being constructed without binders for maintaining structural integrity, and said fibers of said porous medium being wet out by said captured droplets to allow said captured aerosolized oil droplets to continue to interact with said small aerosolized oil drops in the fluid to further extract said small aerosolized oil drops onto said fibers, thereby growing said captured aerosolized oil droplets into a plurality of larger rich oil droplets; and gravitationally separating said plurality of larger rich oil droplets such that said plurality of larger rich oil droplets grow along said porous medium and flow to a base of said porous medium to be deposited in one of a plurality of holding areas positioned at said base of said porous medium and adjacent to the open end of said porous medium, said continuous gas phase flowing through said porous medium and exiting said vessel through an outlet in said vessel, said extraction and removal of said hydrocarbon vapor being accomplished in a single stage.

24. The process according to claim 23 wherein said porous medium is cylindrical.

25. The process according to claim 23 wherein said porous medium has a frustum configuration.

26. The process according to claim 23 wherein said porous medium is a single sheet that is pleated.

27. The process according to claim 23 wherein said porous medium comprises multiple sheets sandwiched together.

28. The method according to claim 27 wherein said multiple sheets form an asymmetric shaped medium having pore size distributions varying in the direction of the flow.

29. The method according to claim 23 wherein said sides of said porous medium are configured vertically with the closed end of the porous medium at the top end.

30. The method according to claim 29 wherein the plurality of larger rich oil droplets and the gas exit the porous medium in a direction that is substantially parallel to the direction in which the gas was initially introduced into the porous medium.

31. The process of claim 1 including the step of orientating the porous medium such that the plurality of larger rich oil droplets and the gas exit the porous medium in a direction that is substantially perpendicular to the direction in which the extraction fluid and gas were initially introduced into the porous medium.

32. The process of claim 1 wherein said porous medium has an open end for receiving said gas stream and wherein said aerosol spray of extraction fluid is delivered to said open end of said porous medium.

33. The process of claim 1 wherein said gas stream is light hydrocarbon, a hydrogen gas stream, or an air stream.

34. The process according to claim 1 wherein the gas stream containing the plurality of aerosolized oil droplets is filtered before moving into the porous medium to prevent plugging and destruction of the porous medium.

35. the process according to claim 34 wherein the pressure drop across the porous medium is less than 20 psi.

36. The process of claim 15 including the step of orientating the porous medium such that the plurality of larger rich oil droplets and the gas exit the porous medium in a direction that is substantially perpendicular to the direction in which the extraction fluid and gas were initially introduced into the porous medium.

37. The process of claim 15 wherein said porous medium has an open end for receiving said gas stream and wherein said aerosol spray of extraction fluid is delivered to said open end of said porous medium.

38. The process according to claim 15 wherein the gas stream containing the plurality of aerosolized oil droplets is filtered before moving into the porous medium to prevent plugging and destruction of the porous medium.

39. the process according to claim 38 wherein the pressure drop across the porous medium is less than 10 psi.

40. The process of claim 23 including the step of orientating the porous medium such that the plurality of larger rich oil droplets and the gas exit the porous medium in a direction that is substantially perpendicular to the direction in which the extraction fluid and gas were initially introduced into the porous medium.

41. The process of claim 23 wherein said aerosol spray of extraction fluid is delivered to said open end of said porous medium.

42. The process according to claim 23 wherein the gas stream containing the plurality of aerosolized oil droplets is filtered before moving into the porous medium to prevent plugging and destruction of the porous medium.

43. the process according to claim 42 wherein the pressure drop across the porous medium is less than 10 psi.

44. A process for the extraction of an unwanted component from a gas comprising:
- introducing an extraction liquid into a fluid having an unwanted component therein to form a physical micro-dispersion comprising a plurality of extraction liquid droplets and the fluid;
- allowing the plurality of extraction liquid droplets to interact with the unwanted component in the fluid to cause the extraction liquid droplets to form into a plurality of aerosolized droplets containing the unwanted component, said plurality of aerosolized droplets including small droplets containing the unwanted component in the range of 0.1 to 1 microns;
- capturing the aerosolized droplets by movement into a porous medium wherein said porous medium is comprised of fibers with dimensions similar to that of said aerosolized droplets at least one of the dimensions of the fibers in said porous medium being in the 0.5 to 2.0 micron range, said porous medium having a specific surface area greater than 1,000 m2/m3, said porous medium being constructed without binders for maintaining structural integrity, and said fibers of said porous medium being wet out by said captured droplets to allow said captured droplets to interact with the unwanted component in the fluid to further extract the unwanted component from the fluid into said captured droplets;
- growing said captured droplets into larger droplets containing the unwanted component; and
- gravitationally separating the larger droplets containing the unwanted component from the fluid by the time the fluid reaches the outside of the porous medium, said extraction and removal of said unwanted component being accomplished in a single stage.

45. The process of claim 44 wherein the unwanted component is a non-hydrocarbon.

46. The process of claim 44 wherein the porous medium is constructed into a frustum, and wherein said aerosolized stream flows from the inside to the outside.

47. The process of claim 45 wherein the step of introducing an extraction liquid into a gas having a non-hydrocarbon comprises introducing a base into said gas.

48. The process of claim 47 wherein said base is a sodium hydroxide or an amine vapor.

49. The process of claim 44 wherein said fibers of said porous medium have an affinity for said extraction liquid when said fibers are wetted out.

50. The process of claim 44 including the step of orientating the porous medium such that the larger droplets and the fluid exits the porous medium in a direction that is substantially parallel to a direction in which the volume of polar liquid was initially introduced.

51. The process of claim 44 including the step of orientating the porous medium such that the larger droplets and the fluid exits the porous medium in a direction that is substantially perpendicular to a direction in which the volume of polar liquid was initially introduced.

52. The process of claim 44 wherein said porous medium is a single sheet that is pleated.

53. The process of claim 44 wherein said porous medium comprises multiple sheets sandwiched together.

\* \* \* \* \*